United States Patent Office 3,502,219
Patented Mar. 24, 1970

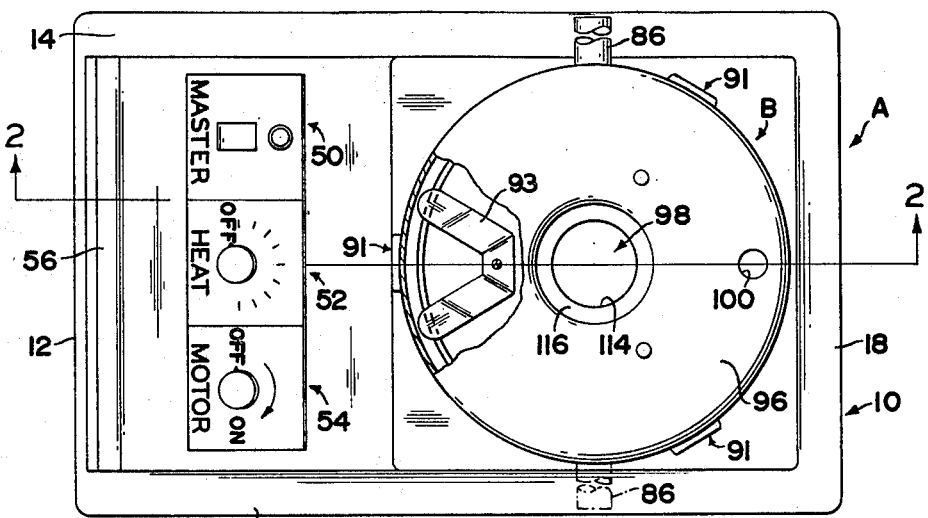

3,502,219
LABORATORY CENTRIFUGAL SEPARATOR
APPARATUS
Bernard J. Starkoff, Shaker Heights, and Edward M. Klopp, Seville, Ohio, assignors to The Chemical Rubber Company, Cleveland, Ohio, a corporation of Ohio
Filed Mar. 11, 1968, Ser. No. 712,018
Int. Cl. B01d 33/06
U.S. Cl. 210—380                        8 Claims

ABSTRACT OF THE DISCLOSURE

An improved centrifugal-type solid-liquid separator which includes a vertically extending shaft mounted for rotation about its longitudinal axis and, motor means for rapidly rotating the shaft. A generally circular filter drum support member is axially aligned with the shaft and drivingly connected thereto. The filter drum for the unit comprises a hollow plastic member having a relatively thin, perforate, cylindrical side wall terminating in upper and lower circumferential edges defining open upper and lower ends. The drum forming member is positioned on the support member with its lower edge in engagement therewith and, releasable connecting means sealingly engage the lower edge and connect the drum member to the support member for rotation therewith.

---

The present invention is directed toward the art of solid-liquid separators and, more particularly, to an improved centrifugal type separator or filter apparatus.

The invention is especially suited for use as a laboratory separator and will be described with particular reference thereto; however, it will be appreciated that the invention is capable of much broader application.

One of the more commonly used laboratory separators comprises a motor arranged to rapidly rotate a vertically mounted, hollow cylindrical filter drum formed from ceramic or metal. The cylindrical side wall of the drum is perforated and the upper end is open. To operate, a piece of filter paper is positioned adjacent the inner surface of the perforate side wall. Thereafter, the drum is rotated and the solution to be filtered poured in the open upper end. Consequently, the solution's liquid portion is driven outwardly through the filter paper and the perforated wall of the drum. The precipitate or solid portion is retained in the drum.

Although the described separator is especially suited for laboratory work and has been widely accepted, the ceramic or metal drum does have substantial drawbacks. For example, following each filtering operation the drum unit must be removed and cleaned and, sometimes, sterilized. Cleaning the unit is somewhat tedious and, where relatively porous, as is the nature of ceramic materials, sterilization is difficult. Further, ceramic drums are often broken during the cleaning or sterilizing operation and, because of their high cost, drum replacement alone can become quite expensive. Metal drums suffer the further disadvantage of being susceptible to corrosive attack by the materials being filtered.

Another disadvantage of commercially available ceramic and metal drums is that they are provided with inwardly directed integral flanges at their upper and lower ends. This arrangement makes it awkward to insert fresh filter paper and virtually impossible to remove the filter cake and paper without losing some of the former.

The present invention provides a centrifugal-type separator having an improved filter drum and mounting arrangement which overcomes the above problems. Separators manufactured in accordance with the invention are resistant to chemical attack less expensive and less subject to breakage than are prior separators. Additionally, the subject invention eliminates the necessity for filter drum cleaning and sterilizing.

In accordance with one aspect of the present invention a centrifugal-type solid-liquid separator is provided which includes a vertically extending shaft mounted for rotation about its longitudinal axis and motor means for rapidly rotating the shaft. Axially aligned with the shaft and connected thereto is a generally circular, filter drum support member. The filter drum for the unit comprises a hollow member preferably formed of plastic, and having a relatively thin, perforated, cylindrical side wall terminating in upper and lower circumferential edges defining open upper and lower ends. The drum forming member is positioned on the support member with its lower edge in engagement therewith and, releasable means are provided for sealingly engaging the lower edge and connecting the drum forming member to the support member.

By mounting the drum-forming member in the manner described, it can be rapidly removed after each usage. Additionally, when formed from plastic, the drum-forming member is an inexpensive replacement element and can be simply thrown away after each use and a new sterile drum put into position. Alternately, the drum can be utilized for storing the filtered solids. As can be seen, this arrangement facilitates drum changing and eliminates the tedious cleaning process previously required by the ceramic or metal drums.

In accordance with a second aspect of the invention a disposable filter drum forming member for use on a laboratory-type centrifugal solid-liquid separator is provided which includes a hollow member preferably formed of plastic, and including a relatively thin, perforated, cylindrical side wall terminating in open upper and lower ends. Both the upper and lower ends are defined by separate horizontally extending circumferential flanges, with the upper flange extending inwardly and the lower flange extending outwardly.

A primary object of the invention is the provision of the improved laboratory-type centrifugal separator.

A further object is the provision of a separator of the type described having an inexpensive and disposable filter drum.

Another object is the provision of a centrifugal separator wherein the filter drum is easily removed.

A still further object of the invention is the provision of an inexpensive, disposable filter drum forming member especially suited for centrifugal separators of the type described.

Yet another object is the provision of a laboratory-type separator which is less subject to breakage, and is more easily cleaned and maintained than prior separators.

These and other objects and advantages will become apparent from the following description when read in conjunction with the accompanying drawings wherein:

FIGURE 1 is a schematic, plan view of a centrifugal separator formed in accordance with the present invention;

FIGURE 2 is a schematic, cross-sectional view taken on line 2—2 of FIGURE 1; and FIGURE 3 is an enlarged schematic view showing the means utilized to sealingly connect the filter drum-forming member to its support.

Referring now to the drawings wherein the showings are for the purpose of illustrating a preferred embodiment of the invention only and not for the purpose of limiting same, FIGURES 1 and 2 show the overall arrangement of the separator which comprises a base unit A which houses the motor and electrical controls and, an upper unit B which houses the filter drum and the liquid receiving bowls.

As best shown in FIGURE 2, base unit A includes a housing 10 which is preferably a one piece casting including a front wall 12, side walls 14 and 16, and a rear wall 18. Two spaced brackets 22 extend inwardly from the front wall 12 and, a pair of similarly arranged brackets 24 extend inwardly from the rear wall. These brackets provide means for connecting resilient rubber mounting feet 26 to the base housing 10 by screws and washers 28. The lower open end of housing 10 is closed by a horizontally positioned bottom plate 30 which is connected between the mounting feet 26 and the brackets 22 and 24 by the screws 28.

A variable speed electric motor 34 is positioned in housing 10 with its output shaft 36 extending vertically. It will be appreciated however that in explosive environments, an explosion-proof, air driven motor and suitable air speed controls may be substituted for electric motor 34 and its electrical controls. The motor is supported from a mounting plate 38 which is connected to the motor casing in any convenient manner, such as through the use of screws 40. The mounting plate 38 is connected to continuous circumferentially extending top flange 42 of housing 10 by vibration dampening mounting means of conventional construction, as for example, the illustrated pair of resilient washers 44 and a bolt 46 and nut 47.

The controls for the separator are mounted in an opening 49 formed in the inclined top face 48 of the housing 10. As shown in FIGURE 1, the controls preferably include a master switch 50 connected with a heater control switch 52 and a motor speed control switch 54. The switches are carried on a thin metal plate 56 which is closely received in an inwardly recess formed in the top front face 48.

Upper unit B comprises a relatively rigid generally cylindrical base member 60 which is preferably of cast construction and includes a cylindrical side wall 62 having a heavy lower edge 64 provided with tapped openings 66. The housing member 60 is releasably connected to the base 10 by screws 68 which extend through openings 66. Base member 60 also includes circumferential flange 70 which is formed integrally with the side walls 62 and extends inwardly thereof. Flange 70 supports a conventional electrical resistance heater ring 72 which is connected to the flange by studs and nuts 74.

Freely received within the open upper end of member 60 and supported by the heater 72 is a bowl member 80. Preferably, bowl member 80 is formed from stainless steel and lined with a chemically resistant plastic, such as a fluorocarbon resin. The bowl member 80 is of cylindrical cross-section and has a bottom wall 82 which extends radially inward toward the center and terminates in a vertically extending flange 84. An outlet or drain spout 86, shown in full and phantom lines, connects with the interior of bowl 80 and extends outwardly of housing B. As shown, the spout 86 is freely received in downwardly extending U-shaped recess 88 formed on the left hand side of member 60 when viewed from the front of housing 10. Preferably, at least one additional recess 88 is provided circumferentially of member 60 so that the bowl 80 can be positioned with the outlet spout 86 as shown in phantom lines, extending to the right hand side when viewed from the front of housing 10.

The outer housing of unit B comprises a cylindrical cover member 90 which has its lower peripheral edge 92 slip-fitted into a recess or notch 94 formed on the upper peripheral edge of member 60. Member 90 may be held in place by any suitable means, as for example a plurality of two-piece, quick-disconnect latch means, designated generally as 91. This allows the cover member 90 to be readily removed so as to provide access to the filter-drum unit C, or to allow bowl 80 to be shifted to permit its outlet spout 86 to extend in a different direction. The top end of casing 90 is partially closed by a circumferential, inwardly extending, flange portion 96 which terminates in a fluid receiving opening 98 through which the solution to be filtered can be poured. To cushion member 90 against vibration during high speed rotation of filter-unit C suitable shock absorbing means may be provided, as for example one or more buter-fly springs 93. As best seen in FIGURE 2, the body portion of spring 93 is secured to the underside of flange 96, while the wing portions yieldingly engage the periphery of bowl 80.

Opening 100 provides access to bowl 80 for a thermometer or other sensing device.

Of particular importance to the present invention is the construction and mounting arrangement of the filter drum unit C. As previously discussed, in the past these filter drum units comprised a cup-shaped ceramic or metal filter bowl which was expensive, difficult to clean, and subject to breakage or corrosive attack. In accordance with the subject invention, the filter drum unit C includes a vertically extending shaft portion 102 which is directly connected to a horizontally positioned, generally circular, filter drum support member 104. In the embodiment under consideration, shaft 102 and support member 104 are arranged to be supported and driven from motor shaft 36. As shown, a press fit sleeve insert 106 extends axially of shaft 102 and is provided with a hexagonal outer periphery to ensure a slip-free connection with the shaft. This bore is arranged to receive motor shaft 36. A coupling 108 connected to motor shaft 36 by a set screw 110. Coupling 108 support the shaft 102, and, additionally, has an upwardly extending key 112 which mates with a groove 114 in the lower end of shaft 102 to thereby transmit the driving rotation to shaft 102.

Positioned on the top of member 104 and axially aligned therewith is the filter drum forming member 110. As shown, member 110 is of generally cylindrical configuration and includes a side wall 112 which preferably tapers inwardy at an angle of approximately 9 to 10 degrees to the vertical. The upper end of member 110 is open as shown at 114 and is defined by a horizontal inwardly extending circumferential flange 116. The lower end of member 110 is also open and is defined by a short, outwardly extending circumferential flange 118. The side wall 112 is provided with uniform perforations 19 which are spaced longitudinally and circumferentially of the wall. Although member 110 can be formed of a variety of materials, plastics are preferred, and an especially suitable plastic is polypropylene. Member 110 may have extremely thin wall thickness, on the order of $\frac{1}{32}$ of an inch. Although the wall is thin, the arrangement of the flanges 116 and 118 provide strength sufficient to permit the member to withstand the centrifugal forces generated during high speed rotation.

Where member 110 is formed of a plastic which can be injection molded, such as polypropylene, the member will preferably take the form illustrated in FIGURE 2. Here the wall of member 110 is provided with an array of gouges 118a extending along axes generally parallel to the longitudinal, conical axis of the member, and terminating in generally tear-shaped perforations 119. This arrangement results from the in situ formation of perforations during the molding operation, by the provision of axially extending pins on the interior surface of at least one die body. Since the pins are axially aligned, their presence does not interfere with the ejection of the molded member 110 from the die body.

The size of perforations 119 can be varied over fairly wide units depending on the maximum rotational speed imparted to member 110. The higher the speed, the smaller is the maximum allowable opening size. By way of example only, when member 110 is used in conjunction with an air driven motor rotating at 9300 r.p.m., perforations 119 should not exceed about 0.065 in. in diameter with a conventional electric motor operating at 6600 r.p.m., larger perforations can be tolerated.

As can be seen the construction of member 110 permits it to be manufactured at a small fraction of the cost of the previously used ceramic filter drum members. Consequently, the members 110 can be economically disposed of after each use. Alternately, the members 110 can be used to store the filtrate resulting from the separating operation of which they were used.

Also of importance to the present invention is the arrangement provided for releasably and sealingly connecting the drum-forming members to the member 104. As best shown in FIGURE 3, member 104 is provided with an annular groove 124 which is arranged to closely receive the lower edge and flange 118 of member 110. Releasable securing means 126 function to sealingly clamp the member 110 to the member 104. Releasable securing means 126 include an O-ring 128 which is sized to fit above flange 118 in groove 124. The forces necessary to clamp O-ring 128 into engagement with the flange 118 and to seal about the lower edge of the member 110 are provided by an annular holding ring 130. As shown, ring 130 is provided with internal threads 132 which mate with corresponding exterior threads 134 formed on the outer periphery of support member 104. As shown, the flange 133 extends inwardly from member 130 and engages the O-ring 128. To facilitate the manual removal of the holding ring 130 its outer periphery is knurled as shown at 136. Additionally, the outer periphery of the lower portion of member 104 is also preferably knurled, as shown at 138.

By forming the drum and its mounting means in the manner described, the problems encountered with the prior ceramic drums are overcome and a centrifugal filter of simple and economical construction provided.

In use, the centrifugal filter or separator of the invention is operated substantially in the manner of prior centrifugal separators of the laboratory type. That is, a piece of filter paper is positioned within the drum forming member and in engagement with the inner surface of sidewall 112 to effectively cover all the perforations 119. Thereafter, the motor 34 is energized to rotate the drum at the selected speed and the solution to be filtered is poured into the upper end of the unit. The liquid portion passes outwardly through the filter paper and drum, and the solid portion is retained in the drum.

Having thus described our invention, we claim:

1. A centrifugal-type solid-liquid separator including: a vertically extending shaft mounted for rotation about its longitudinal axis; motor means for rapidly rotating said shaft; a generally circular filter drum support member axially aligned with said shaft and drivingly connected thereto; a filter drum forming member comprising a hollow member having a relatively thin, perforate, cylindrical side wall terminating in upper and lower circumferential edges defining open upper and lower ends; said drum forming member being positioned on said support member with its lower edge in engagement therewith; and, releasable connecting means sealingly engaging said lower edge and connecting the drum member to the support member for rotation therewith; said releasable connecting means including a collar member surrounding said drum forming member and threadedly connected to said support member.

2. The separator as defined in claim 1 wherein said support member has a circular groove which receives the lower edge of said drum forming member.

3. The separator as defined in claim 1 including an outwardly extending flange formed on the lower edge of said drum forming member, and a circular gasket positioned between said collar and said flange.

4. The separator as defined in claim 1 including resilient seal means between said collar member and said drum forming member.

5. The separator as defined in claim 1 wherein said collar member is threadedly connected to said support member by threads which are concentric with said shaft.

6. A disposable filter drum forming member for use on a centrifugal-type solid-liquid separator, said drum forming member comprising:
a hollow, light-weight plastic member including a relatively thin, generally cylindrical, sidewall terminating in open upper and lower ends, said sidewall tapering inwardly from said lower end to said upper end, with a plurality of perforations formed in said sidewall and spaced relatively uniformly longitudinally and circumferentially thereof;
a radially inwardly extending circumferential flange formed at said upper end; and
said lower open end being defined by a radially outwardly extending flange member.

7. The filter drum forming member as defined in claim 6 wherein each of said perforations includes a gouge extending parallel to the axis of the hollow member and terminating in the perforation.

8. A disposable filter drum assembly comprising the filter drum forming member as defined in claim 6, in combination with a generally circular filter drum support member having an annular groove receiving said circumferential mounting flange, releasable connecting means including a collar surrounding said drum forming member and threadedly connected to said support member; and means in said support member for drivingly receiving a motor shaft.

References Cited
UNITED STATES PATENTS

| | | | |
|---|---|---|---|
| 650,402 | 5/1900 | Laplace | 210—380 |
| 1,797,876 | 3/1931 | Mitchum | 210—380 X |
| 2,414,645 | 1/1947 | Hays | 210—382 |
| 2,475,982 | 7/1949 | Oberg | 210—382 X |
| 3,225,929 | 12/1965 | Sicard | 210—232 |

JAMES L. DECESARE, Primary Examiner